United States Patent
Bohn, Jr. et al.

(10) Patent No.: US 6,618,031 B1
(45) Date of Patent: Sep. 9, 2003

(54) METHOD AND APPARATUS FOR INDEPENDENT CONTROL OF BRIGHTNESS AND COLOR BALANCE IN DISPLAY AND ILLUMINATION SYSTEMS

(75) Inventors: Lowell F. Bohn, Jr., Boulder, CO (US); Douglas J. McKnight, Boulder, CO (US)

(73) Assignee: Three-Five Systems, Inc., Tempe, AZ (US)

( * ) Notice: Subject to any disclaimer, the term of this patent is extended or adjusted under 35 U.S.C. 154(b) by 0 days.

(21) Appl. No.: 09/258,512

(22) Filed: Feb. 26, 1999

(51) Int. Cl.$^7$ .................................................. G09G 3/32
(52) U.S. Cl. ............................. 345/83; 345/82; 345/691
(58) Field of Search ............................ 345/83, 82, 77, 345/691, 88, 91, 692, 693

(56) References Cited

U.S. PATENT DOCUMENTS

| | | | | |
|---|---|---|---|---|
| 4,870,325 A | * | 9/1989 | Kazar ........................... | 345/83 |
| 5,534,889 A | * | 7/1996 | Reents ......................... | 345/148 |
| 5,612,753 A | | 3/1997 | Poradish et al. | |
| 5,642,130 A | * | 6/1997 | Browne ........................ | 345/111 |
| 5,650,832 A | | 7/1997 | Poradish et al. | |
| 5,657,099 A | | 8/1997 | Doherty et al. | |
| 5,668,572 A | | 9/1997 | Meyer et al. | |
| 5,669,690 A | | 9/1997 | Hodson et al. | |
| 5,680,180 A | | 10/1997 | Huang | |
| 5,684,368 A | | 11/1997 | Wei et al. | |
| 5,812,105 A | * | 9/1998 | Van de Ven .................. | 345/83 |
| 5,914,700 A | * | 6/1999 | Tonosaki ..................... | 345/148 |
| 5,920,298 A | | 7/1999 | McKnight | |
| 5,936,599 A | * | 10/1999 | Reymond ..................... | 345/82 |
| 6,028,597 A | * | 2/2000 | Ryan et al. .................. | 435/148 |
| 6,078,303 A | | 6/2000 | McKnight | |
| 6,097,360 A | * | 8/2000 | Holloman ..................... | 345/84 |
| 6,097,367 A | * | 8/2000 | Kuriwaki et al. ............ | 345/150 |
| 6,115,016 A | * | 9/2000 | Yoshihara et al. ............ | 345/88 |
| 6,121,767 A | * | 9/2000 | Havel .......................... | 345/83 |
| 6,229,508 B1 | * | 5/2001 | Kane ........................... | 345/82 |
| 6,362,835 B1 | * | 3/2002 | Urbanus et al. ............. | 345/692 |

FOREIGN PATENT DOCUMENTS

| | | |
|---|---|---|
| EP | 0762374 A1 | 3/1997 |
| JP | 09305145 | 11/1997 |

OTHER PUBLICATIONS

PCT International Search Report, date mailed Jul. 10, 2000, PCT/US00/05020, 7 pages.

* cited by examiner

Primary Examiner—Richard Hjerpe
Assistant Examiner—Kimnhung Nguyen
(74) Attorney, Agent, or Firm—Ingrassia Fisher & Lorenz, P.C.

(57) ABSTRACT

A drive circuit for a time sequential color LED based display device allows the overall brightness of a display device to be adjusted without affecting the color balance. The circuit includes a boost switching converter, which provides constant power to each of a plurality of different colored LEDs associated with a pixel, independent of the forward voltage across each LED. The boost switching converter receives a pulse width modulated drive signal for activating each LED, when enabled, during a frame. The on-time of the drive signal varies during each frame according to which LED is to be activated at a particular point in time, to provide the appropriate power to the LED. The LEDs are enabled sequentially during a frame by separate enable signals. The cathode of each LED is connected to a positive power supply voltage when the LED is enabled.

4 Claims, 13 Drawing Sheets

METHOD AND APPARATUS FOR INDEPENDENT CONTROL OF BRIGHTNESS AND COLOR BALANCE IN DISPLAY AND ILLUMINATION SYSTEMS

FIELD OF THE INVENTION

The present invention pertains generally to display systems and illumination sources, such as emissive, reflective, or transmissive displays, which may use time-sequential color illumination. More particularly, the present invention relates to drive circuitry for display systems or illumination sources.

BACKGROUND OF THE INVENTION

In display devices used in computer systems, television sets, instrument panels, and various other devices, the fundamental picture element is often referred to as a pixel. A display screen, or raster, generally comprises a large number of pixels arranged adjacently in a rectangular matrix. In a color display device, each pixel generally has multiple components, or subpixels, each of which displays light of a particular fundamental color. In a red-green-blue (RGB) display system, for example, each pixel includes a red subpixel, a green subpixel, and a blue subpixel. For a given pixel, the combination of the intensities of the subpixels determines the overall color of the pixel perceived by the user. Depending on the type of display device, such as a color cathode ray tube (CRT) or liquid crystal display (LCD), both commonly used for computer monitors and television, the red, green, and blue subpixels are arranged spatially to form a pixel. The subpixels may be produced using any of various technologies, such as color light-emitting diodes (LEDs), LCD elements, phosphors, incandescent lamps, mirrors, etc.

One approach to generating a color pixel is to simultaneously illuminate each of the color subpixels of the pixel at independently-selected intensities. In contrast, in a time-sequential color based display or its illumination system, each pixel is illuminated sequentially in time, rather than simultaneously, during each frame. A frame is the time required to display an entire raster, or more specifically, the time between vertical synchronization pulses in a conventional display device. The subpixels are illuminated so rapidly and close together in time that a person perceives the color of the pixel as a blend of the light output.

Certain problems are associated with prior art display devices and illumination systems. For example, in some LED display devices, a ballast resistor current source is used to power the LEDs. However, display devices which use ballast resistor current sources tend to use power inefficiently and require higher voltages. In addition, in ballast resistor current source drive circuits, the current through an LED varies nonlinearly with both power supply voltage variations and LED forward voltage variations. Consequently, the color balance will vary substantially with even small changes in power supply voltage. Further, it is difficult to adjust the brightness of a color element (i.e., a pixel or illumination source) without affecting: 1) the color balance of the display, pixel, or illumination source, and 2) the uniformity of the display itself.

Figure 1:
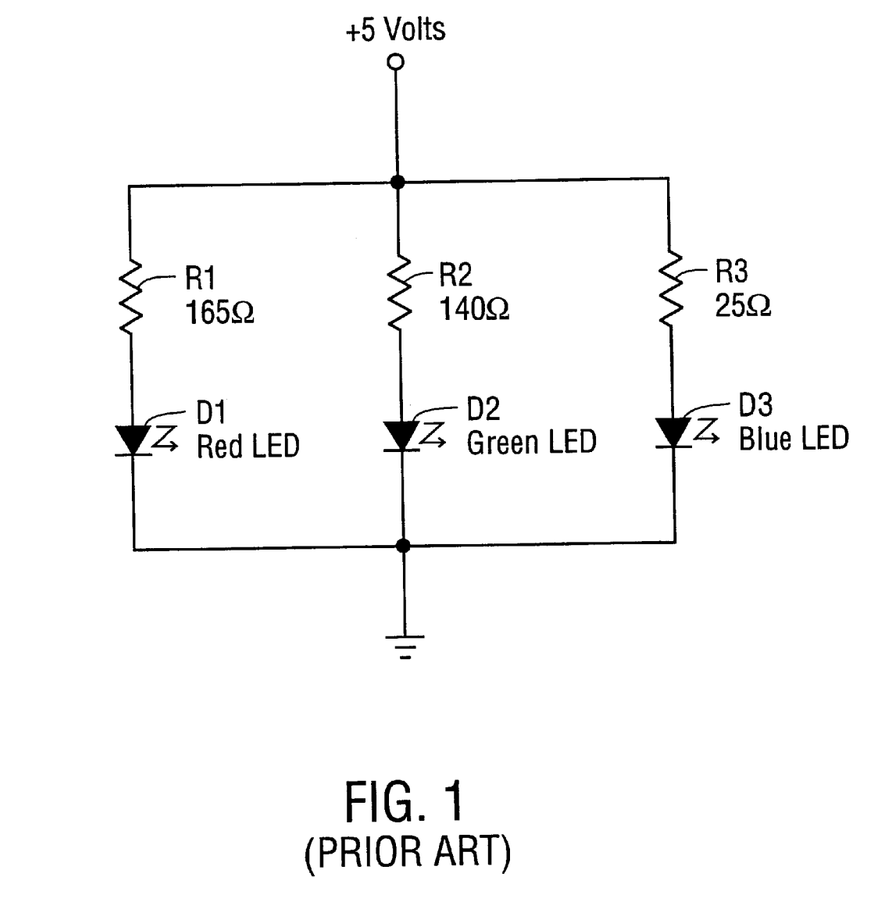
FIG. 1 illustrates an LED drive circuit of the prior art.

Refer now to FIG. 1, which illustrates a well-known LED drive circuit of the prior art. Note that the component and parameter values shown are only for the purpose of illustration. As shown, the drive circuit includes a ballast resistor (R1, R2, and R3) in series with each LED of a pixel between the LED (D1, D2, and D3) and the supply voltage. In this circuit, the current through each LED will vary with both power supply voltage and LED forward voltage variations. Because different colored LEDs have different device characteristics and different forward voltage requirements, the color balance will vary significantly with a small change in the power supply voltage. Although color balance might be achieved by individually selecting ballast resistors for each LED during the manufacturing process, to do so would be impractical and costly. Alternatively, color balance might be achieved by using adjustable resistors to adjust the current through each LED. However, again, to do so would be impractical and costly. In addition, blue LEDs, in particular, tend to require a higher forward voltage to operate than red or green LEDs. With the circuit of FIG. 1, the blue LED will not operate if the supply voltage falls below approximately 4.5 volts. Moreover, the ballast resistors R1, R2 and R3 tend to dissipate excessive amounts of power.

Figure 2:
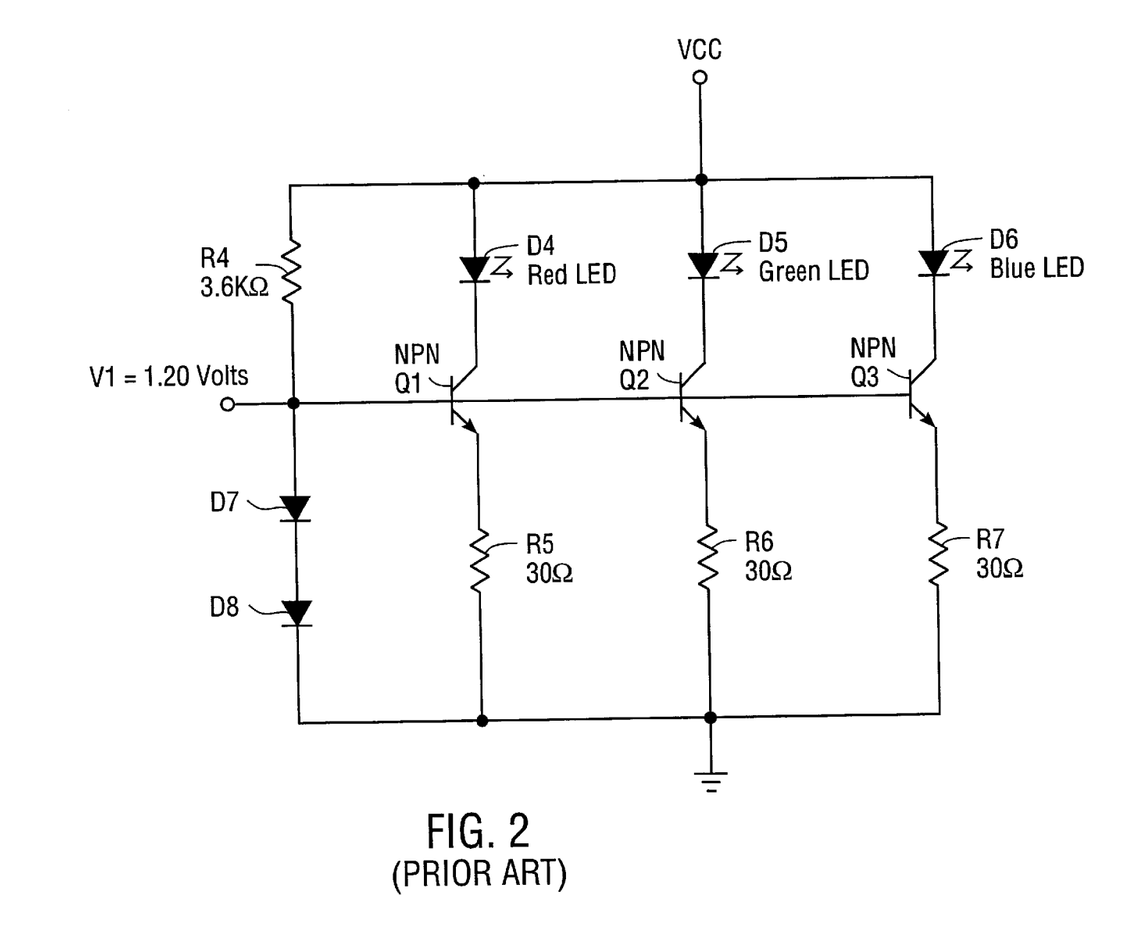
FIG. 2 illustrates a second LED drive circuit of the prior art.

FIG. 2 illustrates another well-known LED drive circuit of the prior art. A reference voltage of approximately 1.2 volts, for example, is created using a resistor R4 and two diodes D7 and D8. The reference voltage is applied to the bases of three transistors Q1, Q2 and Q3 to create a constant current source by the voltage across the emitter resistor creating a current and the transistors' collector and emitter currents being equal. As with the circuit of FIG. 1, color balance might be achieved by individually selecting emitter resistors (R5, R6, and R7) for each current source during the manufacturing process; however, as noted above, that is not a desirable solution. Similarly, while color balance might be achieved by using adjustable resistors to adjust the current through each LED, such a circuit would be difficult to use, impractical, and costly. The color balance and the overall brightness might alternatively be adjusted by using digital-to-analog converters to drive the base of each transistor in the current source. However, that approach would increase the cost of the associated control circuitry. Moreover, as with the circuit of FIG. 1, it is difficult or impossible to turn on the blue LED when the power supply falls below a certain level, i.e., approximately 5.3 volts in the circuit of FIG. 2. Also, as with the circuit of FIG. 1, a significant amount of power is wasted by dissipation in the resistors as well as in the transistors.

Accordingly, what is needed is a color display or illumination source drive circuit that overcomes the above-noted disadvantages of the prior art. Specifically, what is needed is a drive circuit that efficiently drives a display color element (i.e., pixel or illumination source), such as an LED, using a system power supply that can tolerate a variation of supply voltage. Furthermore, it is preferred that color balance be maintained independent of variations in supply voltage or individual pixel or illumination source characteristics. What is further needed is a drive circuit that enables the overall brightness of a display, pixel, or illumination source and the brightness of individual pixels or color illumination sources to be adjusted independently, using easy-to-implement, power-efficient, and inexpensive components and techniques.

SUMMARY OF THE INVENTION

One aspect of the present invention is a method and apparatus for controlling the brightness of a pixel or illumination source of a display device independent of color balance.

Another aspect of the present invention is a method and apparatus for operating a pixel or illumination such that its performance is relatively insensitive to variations in power supply or device characteristics.

Another aspect of the present invention is a method and apparatus for operating a color display device that has at least one pixel capable of displaying multiple colors sequentially during each of multiple frames. A drive signal is generated to activate the pixel during each of the frames. The on-time of the drive signal is varied within each of the frames according to which of the colors is being displayed.

In various embodiments, such apparatus may include a boost switching converter or a flyback switching converter. Also, in various embodiments, these and other aspects of the present invention may be applied to emissive, transmissive, or reflective display systems.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Drive circuits for driving color pixels or illumination sources using a variable on-time drive signal are described. Among other advantages, the described drive circuits allow the overall brightness of the display system or illumination source to be adjusted without affecting the color balance. The circuits accomplish this goal while supplying constant power to each LED for a given supply voltage, independent of the forward voltage of the LED.

The techniques described herein can be applied to transmissive, reflective, or emissive display systems. Although the embodiments described herein relate primarily to LED type display systems, the described techniques may also be applied to display devices based on other technologies, such as LCDs or display devices based on phosphors, incandescent lamps, mirrors, etc.

Figure 3:
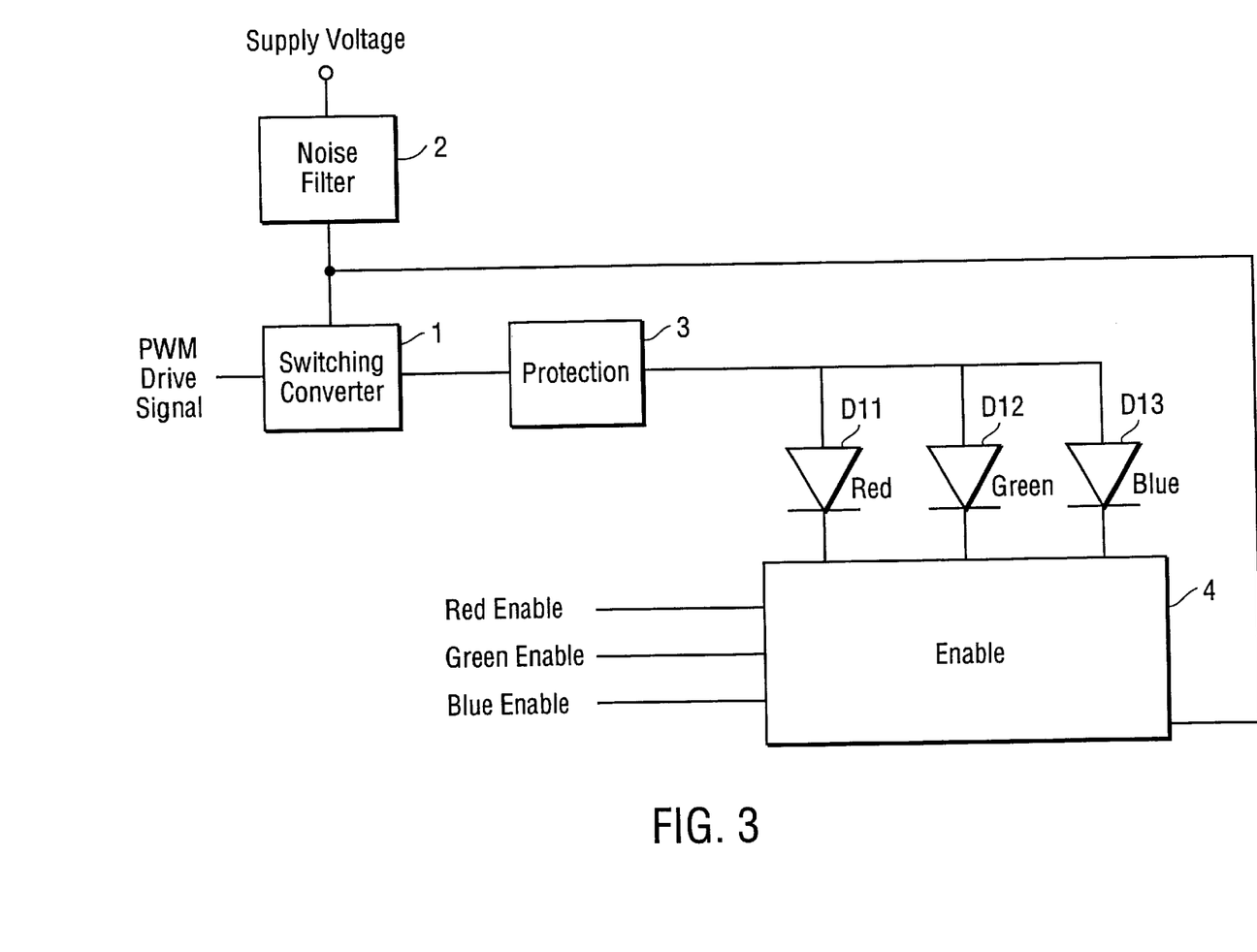
FIG. 3 illustrates an LED drive circuit which uses a switching converter responsive to a variable on-time drive signal to drive color LEDs, for a common anode embodiment.

Refer now to FIG. 3, which illustrates one embodiment of a drive circuit for a color pixel or illumination source. Note that in this description, the terms "pixel" and "illumination source" are sometimes referred to disjunctively (as alternatives), as in the preceding sentence. However, in some embodiments of the present invention, a display pixel may incorporate the illumination source. Thus, the terms "pixel" and "illumination source" are not mutually exclusive in the context of the present invention, nor is any mutual exclusivity implied by use of the phrase "pixel or illumination source" or other similar expression in this description.

FIG. 3 illustrates a "common-anode" embodiment of a drive circuit. An alternative embodiment is a "common cathode" configuration, an example of which is described below and shown in FIG. 6. Referring to FIG. 3, LEDs D11, D12, and D13 are the red, green, and blue LEDs, respectively, associated with a given pixel or illumination source in a display system. Note that while the embodiment of FIG. 3 and other embodiments in this description are based on the RGB color space, alternative embodiments may be based on other color spaces and therefore use different fundamental colors for each pixel or illumination source.

The drive circuit of FIG. 3 includes a switching converter 1, a noise filter 2, a protection circuit 3, and an enable circuit 4. Enable circuit 4 is coupled to the cathodes of each of the red, green, and blue LEDs and is coupled to the supply voltage through the noise filter 2. In addition, enable circuit 4 receives separate red, green, and blue enable signals for enabling the red, green, and blue LEDs, respectively. Switching converter 1 is coupled to receive the supply voltage through the noise filter 2 and is further coupled to receive a pulse width modulated (PWM) drive signal. The output of the switching converter 1 is connected to the anodes of each of the red, green, and blue LEDs through protection circuit 3.

Figure 5:
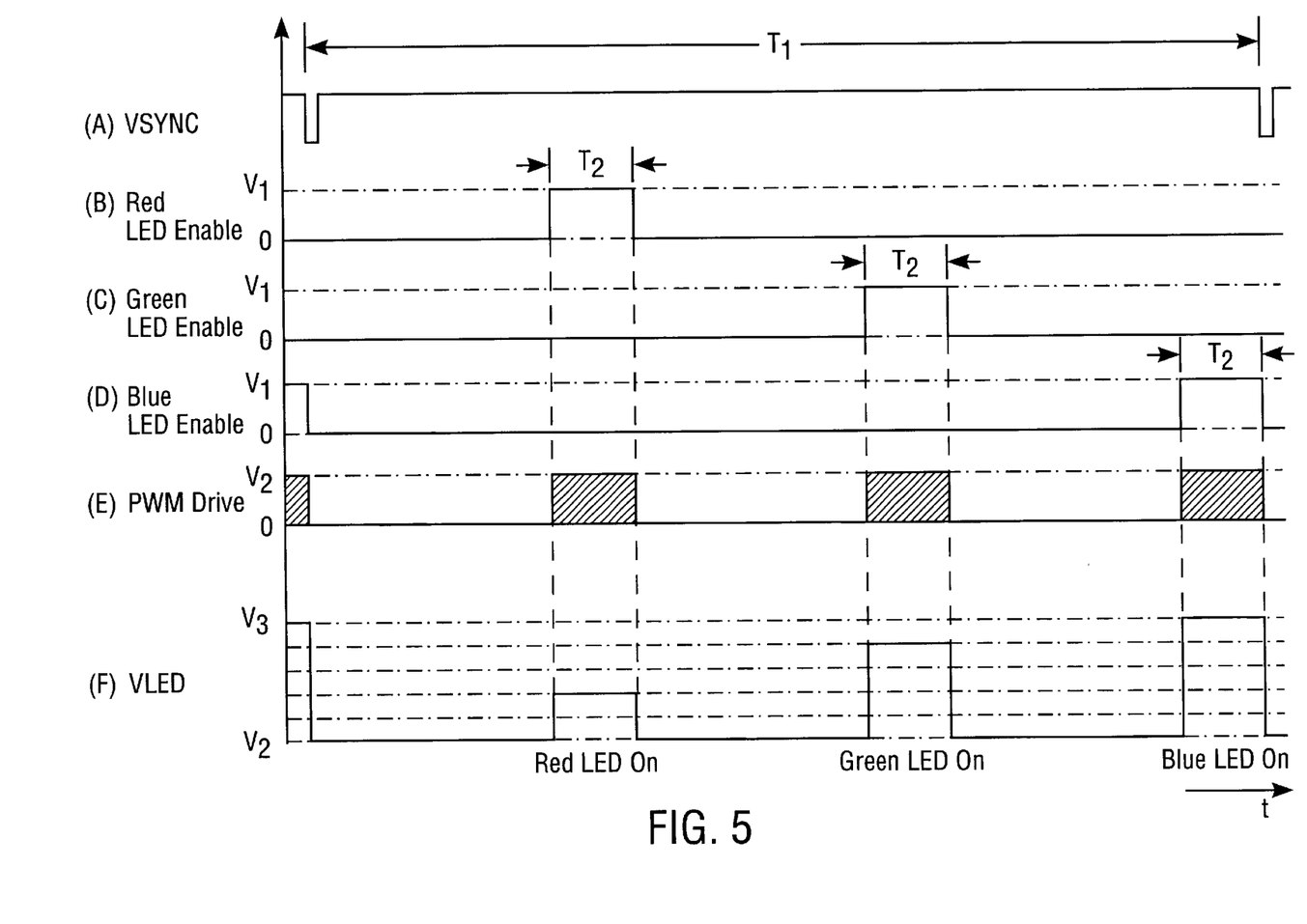
FIG. 5 is a timing diagram illustrating relationships between the red, green, and blue enable signals, the PWM drive signal, and the LED forward voltages, in the circuits of FIGS. 3 and 4.

Protection circuit 3 operates to prevent damage to the switching converter 1 due to a fault in the drive circuit, such as an open or short circuit in one of the LED paths. In a time-sequential color embodiment, the red, green, and blue enable signals are asserted during each frame to sequentially enable the red, green, and blue LEDs, respectively. FIG. 5, which will be discussed further below, shows the timing relationships between the red, green, and blue enable signals for a given frame of duration $T_1$. In response to one of the red, green, and blue enable signals being asserted, the enable circuit connects the cathode of the corresponding LED to the supply voltage through noise filter 2.

Each of the red, green, and blue LEDs is enabled once per frame during a separate time interval. The switching converter 1 activates each LED, when enabled, in response to the PWM drive signal being activated. The PWM drive signal is a time-variant signal, when activated. The "on-time" (pulse width) and frequency of the PWM drive signal can be varied within each frame to control the light output of each of the red, green, and blue LEDs. Specifically, the on-time of the PWM drive signal can be varied within each frame to independently select the brightness of each LED, and hence, the color balance of the pixel or illumination source; the frequency of the drive signal can be selected to adjust the overall brightness of the pixel or illumination source.

Note that the details of the circuitry which generates the PWM drive signal and the red, green, and blue enable signals are not necessary for an understanding of the present invention and are therefore not described herein. Essentially, any circuitry which provides these signals in accordance with this description may be used.

Figure 4:
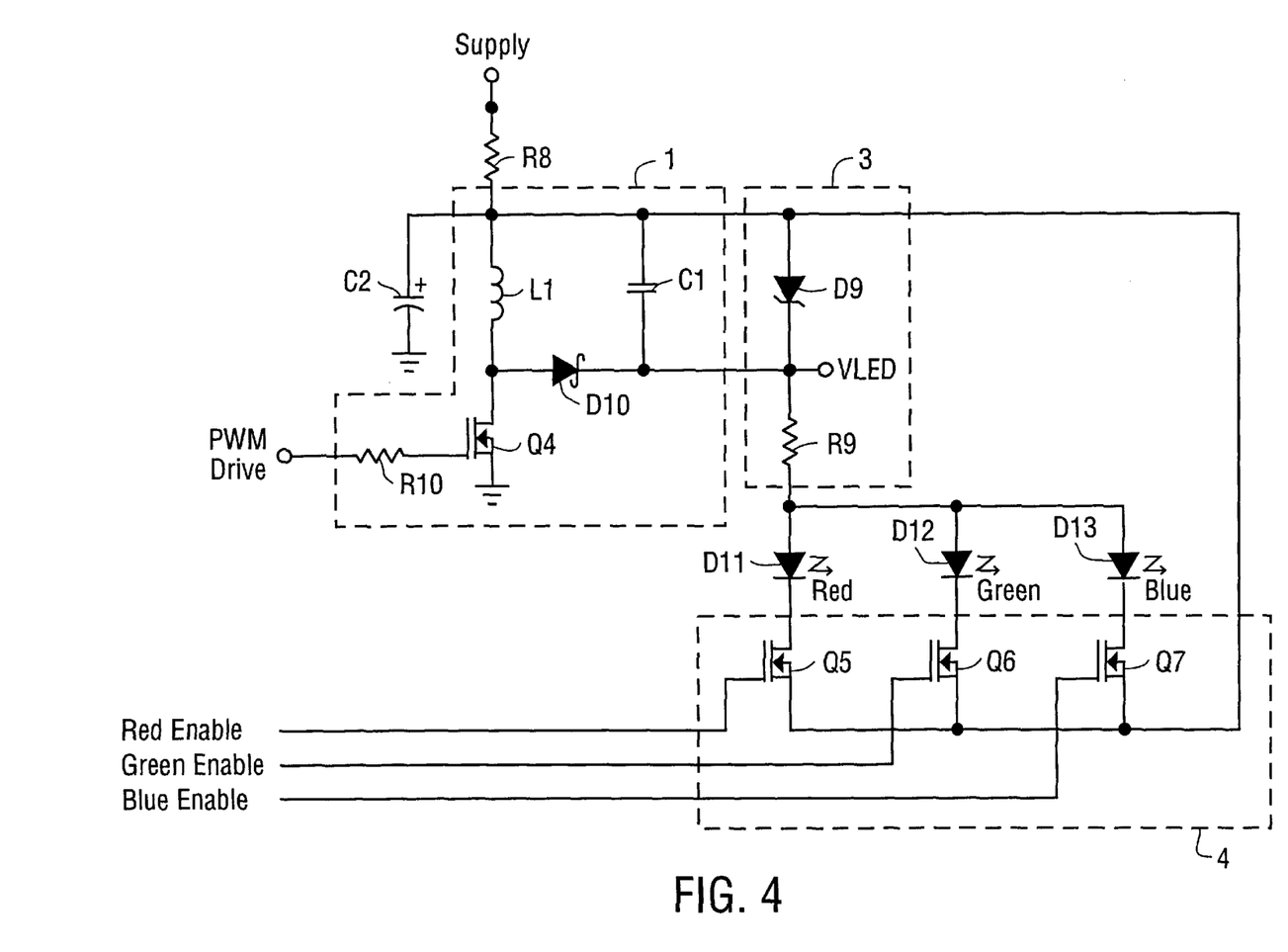
FIG. 4 illustrates the circuit of FIG. 3 in greater detail, according to an embodiment which uses a boost switching converter.

FIG. 4 illustrates the drive circuit of FIG. 3 in greater detail, according to an embodiment in which the switching converter 1 is a boost switching converter. Resistor R8 and capacitor C2 form noise filter 2. Resistor R8 and capacitor C2 are connected to each other in series between the positive power supply voltage and the power supply ground. Enable circuit 4 includes three n-channel Metal-Oxide-Semiconductor Field Effect Transistors (MOSFETs) Q5, Q6 and Q7, with their drains connected to the cathodes of the red, green, and blue LEDs, D11, D12, and D13, respectively. The sources of transistors Q5, Q6 and Q7 are coupled together and to the power supply through resistor R8. The gates of transistors Q5, Q6 and Q7 are coupled to the red, green, and blue enable signals, respectively.

The boost switching converter 1 includes resistor R10, n-channel MOSFET Q4, inductor L1, capacitor C1, and Schottky diode D10. The gate of transistor Q4 is coupled to receive the PWM drive signal through resistor R10. The source of transistor Q4 is coupled to the power supply ground, while the drain of transistor Q4 is coupled to the positive power supply voltage through the series combination of resistor R8 and inductor L1. The anode of diode D10 is connected to the drain of transistor Q4, while the cathode of diode D10 is coupled to capacitor C1. The series combination of diode D10 and capacitor C1 is coupled in parallel with inductor L1. The common node between diode D10 and capacitor C1 forms the output node of boost switching converter 1, the voltage of which is designated VLED and corresponds to the forward voltage of the currently enabled LED.

Protection circuit 3 includes Zener diode D9 and resistor R9. Diode D9 is coupled in parallel with capacitor C1 with its cathode connected to the output (VLED) node of boost switching converter 1. Resistor R9 is coupled between the VLED node and the connected anodes of the red, green, and blue LEDs. Resistor R9 provides peak current limiting to the LEDs D11, D12 and D13. Diode D9 protects boost switching converter 1 in the event that one or more of the red, green, and blue LEDs is open circuited.

Operation of the circuit of FIG. 4 will now be described with reference to both FIGS. 4 and 5. The PWM drive signal drives the gate of transistor Q4. The PWM drive signal is time-variant from 0-to-$V_2$ volts when active and is steady-state at 0 volts when not active. Transistor Q4 is turned on when the PWM drive signal is on and off when the PWM drive signal is off. For purposes of this description, the PWM drive signal is said to be "on" when, in its active state, the PWM drive signal is at (or substantially close to) $V_2$ and is said to be "off" when, during either its active or inactive state, the PWM drive signal is at (or substantially close to) 0 volts. When Q4 is turned on, the current through inductor L1 increases with time. When Q4 is subsequently turned off (the PWM drive signal goes low), the voltage across inductor L1 will "flyback" to a voltage which is greater than the positive supply voltage. The flyback voltage across L1 will charge capacitor C1 through diode D10. The energy stored in inductor L1 is a function of the on time of Q4 and, hence, the energy transferred is a function of the on-time and frequency of PWM drive signal, as well as the supply voltage and inductance of L1.

Referring to FIG. 5, during a frame of duration $T_1$ (the time between vertical synchronization pulses), transistors Q5, Q6 and Q7 are sequentially turned on and off by the red, green, and blue enable signals, respectively, to enable the red, green, and blue LEDs, respectively. The red, green and blue enable signals vary between 0 volts when not asserted and $V_1$ when asserted. The PWM drive signal is active concurrently with assertion of the red, green, and blue enable signals for time intervals of duration $T_2$ within the frame. Within each frame, the on-time of the PWM drive signal is selected to be different for each of the red, green, and blue LEDs. To provide the appropriate power (i.e., brightness) for each LED, which is different for each LED, the PWM drive signal has a different amount of on-time for each LED. Thus, the color balance of the pixel or illumination source can be adjusted by setting the on-time of the PWM drive signal appropriately for each LED, while the overall brightness of the pixel or illumination source can be adjusted by appropriately setting the frequency of the PWM drive signal. The frequency of the PWM drive is assumed to be the same for all three LEDs. Consequently, the overall brightness of the pixel or illumination source can be adjusted without affecting the color balance. Within each frame, the forward LED voltage (VLED) will have values in the range from $V_2$ (i.e., when no LED is activated) to $V_3$ (i.e., when the blue LED is activated). Note that $V_3$ may be greater than or less than the positive supply voltage; hence, the forward voltage VLED may be greater than the supply voltage.

It will be recognized that, for a given on-time and frequency of the PWM drive signal and supply voltage, the circuit of FIG. 4 provides constant power to each LED, independent of the LED forward voltage. The output power is given by equation (1).

$$\text{Output Power} = \frac{1/2L1\left\{\frac{\text{Supply Voltage} \cdot \text{Q4 On-Time}}{L1}\right\}^2}{\frac{1}{\text{Q4 Frequency}}} = \frac{\{\text{Supply Voltage} \cdot \text{Q4 On-Time}\}^2 \cdot \text{Q4 Frequency}}{2 \cdot L1} \quad (1)$$

If the supply voltage changes, the power to the red, green, and blue LEDs will change by the same ratio. Consequently, while the overall brightness of the pixel or illumination source may change if the supply voltage changes, the balance of red, green, and blue illumination will remain constant. In addition, the circuit of FIGS. 3 and 4 will drive the LEDs using essentially any supply voltage, provided enough voltage is available to switch transistor Q4 on and off. In low voltage applications, a very low power charge pump can be used to achieve the required PWM drive signal level needed to switch Q4. Further, by connecting the cathodes of the red, green, and blue LEDs to the positive supply voltage, the LED forward voltages can be greater than or less than the positive supply voltage. Further, the drive circuit of the present invention generally provides greater power efficiency than prior art drive circuits.

The following are component and parameter values associated with FIGS. 4 and 5 for one particular embodiment of the present invention: $V_1$ (enable signals) is 12 volts, and $V_2$ (PWM drive signal) is 5 volts; the PWM drive signal has a nominal on-time of 1 μsec for the red LED, 2 μsec for the green LED, and 2.5 μsec for the blue LED and a nominal frequency of 200 KHz; resistor R8 is 0.20 Ω, 0.25 watts; resistor R9 is 1Ω, 0.5 watts; resistor R10 is 22Ω; capacitor C1 is a 1.0 μF, 16 volt ceramic capacitor; capacitor C2 is a 47 μF 10 volt low ESR capacitor; inductor L1 is 47 μH, 450 mA peak current; diode D10 is a 1N5819 Schottky diode; diode D9 is a 12 volt, 500 mW Zener diode; transistor Q4 is an NDS355 AN 30 volt NFET; and, transistors Q5, Q6 and Q7 are NDS351AN NFETs. LEDs D11, D12 and D13 are provided by a single Nichia NSCM310A package.

Figure 6:
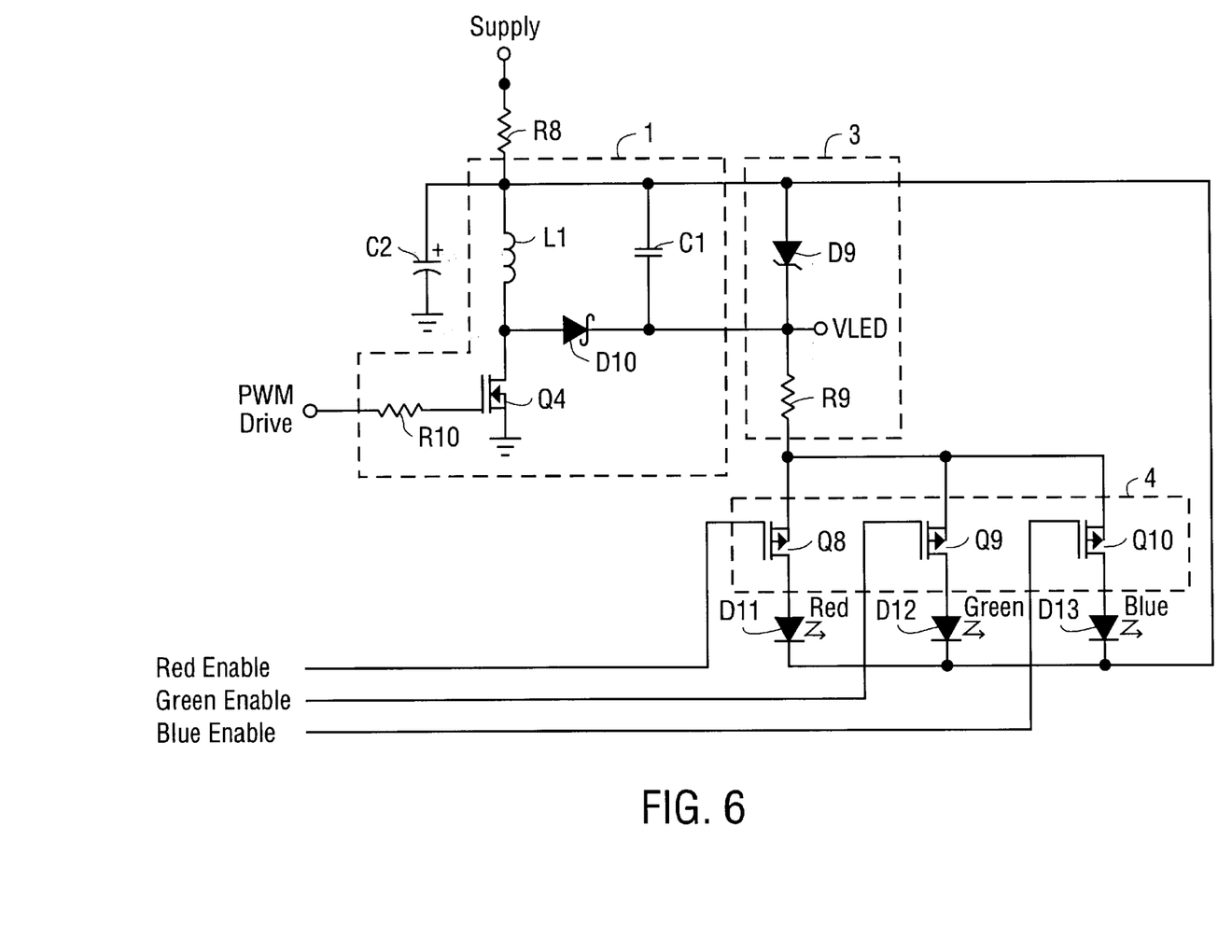
FIG. 6 illustrates an LED drive circuit which uses a boost switching converter responsive to a variable on-time drive signal to drive color LEDs for a common-cathode embodiment

The circuits of FIGS. 3 and 4 are common anode circuits, as noted above. In alternative embodiments, the LED drive circuit may be a common cathode circuit, an example of which is illustrated in FIG. 6. The illustrated common cathode circuit is substantially identical to the common anode circuit, however, LEDs D11, D12, and D13 have their cathodes coupled together and to resistor R8. Also, NFETs Q5, Q6 and Q7 have been replaced with p-channel FETs (PFETs) Q8, Q9, and Q10, respectively, each of which has its drain connected to the anode of the corresponding LED and its source connected to resistor R9. In one embodiment, PFETs Q8, Q9 and Q10 are NDS352AP PFETs.

Figure 7:
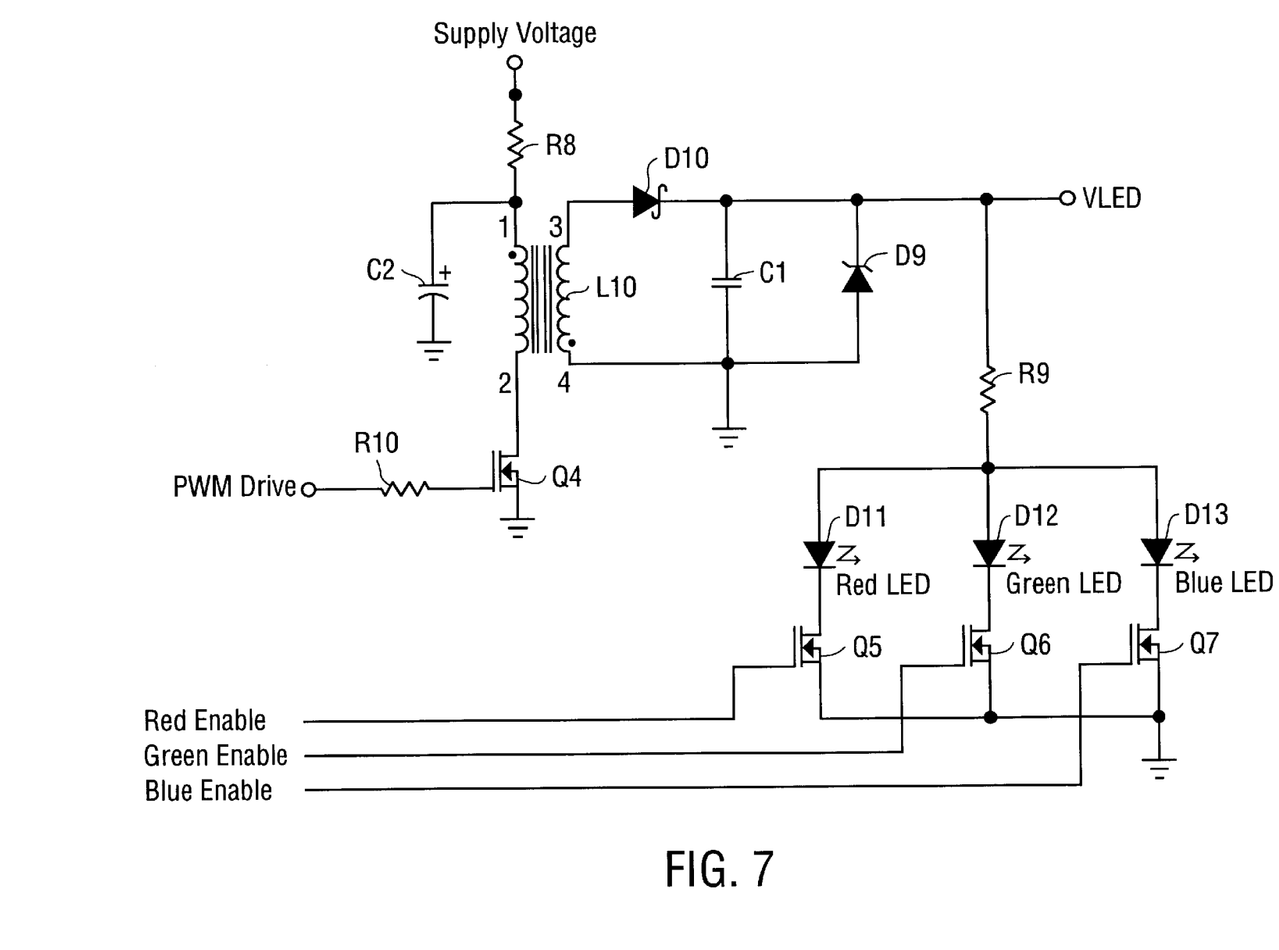
FIG. 7 illustrates a flyback switching converter embodiment of a drive circuit for driving LEDs in a common-annode configuration.

In certain embodiments of the drive circuit, a flyback transformer switching converter may be used instead of a boost switching converter. Such embodiments may be used for emissive displays or illumination sources that can be optically coupled or projected onto an array of reflective or transmissive pixels forming a display. Such embodiments may operate based upon the general principles described above. FIG. 7 illustrates one embodiment of a drive circuit using a flyback transformer switching converter. As shown, flyback transformer L10 is used in place of conductor L1 (FIG. 4). Although FIG. 7 shows a common-anode configuration, a common-cathode embodiment of the flyback transformer switching converter circuit can be easily constructed using the techniques described above in connection with FIG. 6.

Some embodiments of the drive circuit may have a single-ended primary inductor converter (SEPIC) configuration. A SEPIC topology may be useful to reduce the input ripple current to the converter, providing a quieter circuit. An example of such an embodiment can be achieved by modifying the circuit of FIG. 7 (common-anode configuration) to add a capacitor between the anode of diode D10 and the drain of transistor Q4. A common-cathode SEPIC embodiment may be easily constructed in like manner.

Figure 8:
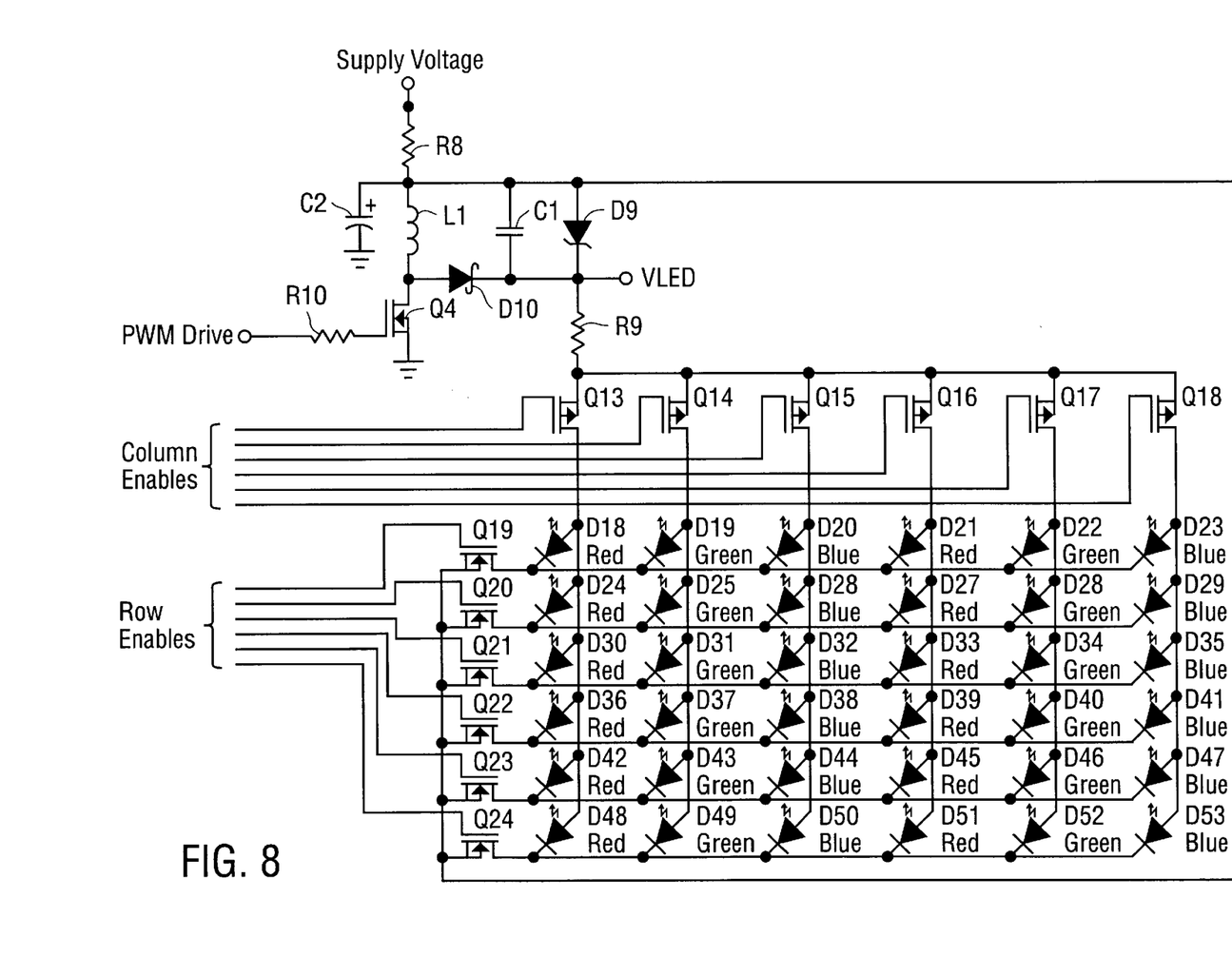
FIG. 8 illustrates an embodiment of a drive circuit for an emissive temporal LED array display using a variable on-time drive signal.

FIG. 8 illustrates an emissive temporal (i.e., time-sequential) array embodiment of a drive circuit that is responsive to a PWM drive signal. As shown, color LEDs D18 through D53 are arranged in an array of rows and columns. In the illustrated embodiment, each column includes LEDs of a single color; the array includes six columns and six rows, with each row including two sets of red, green, and blue LEDs. Note, however, that the illustrated embodiment is only one example of an emissive array that can be expanded to include essentially any number of LEDs, as necessary. Row enable NFETs Q19 through Q24 are provided to enable the rows. The LEDs of each row have their cathodes connected to the drain of the row enable NFET for that row. The sources of row enable NFETs Q19 through Q24 are coupled together and to the node which connects resistor R8 to capacitor C2. The gates of row enable NFETs Q19 through Q24 are each coupled to a separate row enable signal.

Column enable PFETs Q13 through Q18 are provided to enable each column of the array. The LEDs of each column have their anodes coupled to the source of the column enable PFET for that column. The drains of column enable PFETs Q13 through Q18 are connected to resistor R9. The gates of column enable PFETs Q13 through Q18 are each coupled to a separate column enable signal.

Figure 9:
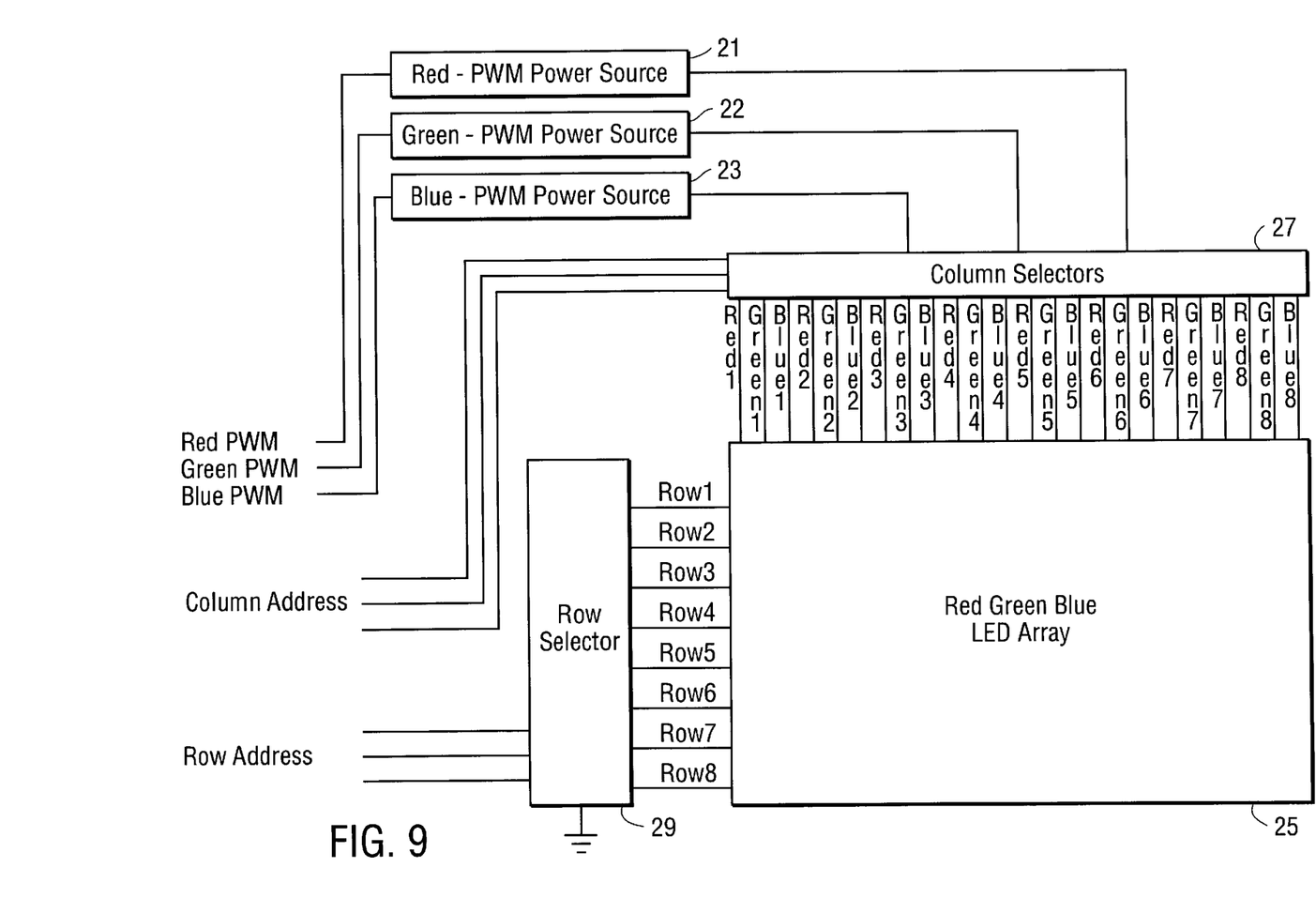
FIG. 9 illustrates an embodiment of a drive circuit for an emissive LED spatial array.

Using combinations of the configurations described above, the above techniques can also be applied to a spatial (rather than temporal) array of emissive sources, such as LEDs, fluorescent sources, electro-luminescent sources, plasma-lumnescentources, etc. Thus, FIG. 9 shows an embodiment that demonstrates the ability to drive emissive pixel elements or illumination sources simultaneously rather than sequentially. In particular FIG. 9 illustrates an emissive LED spatial array 25 driven by three switching drive circuits 21, 22, and 23, for the red, green, and blue color components, respectively. The drive circuits 21, 22 and 23 may be of the above-described boost, flyback, or SEPIC switching converters, that are responsive PWM drive signals. As shown, pixels comprising red, green, and blue LEDs are arranged in an eight-by-eight-array Note, however, that the illustrative embodiment is only one of an emissive LED spatial array, which can be expanded as desired to include essentially any number of LEDs or columns electors 27, which select the appropriate columns of the LED array 25 in other color emissive sources. The drive circuits 21, 22, and 23 provide their outputs to columns electors 27, which select the appropriate columns of the LED array 25 in response to those outputs and a column address. A row selector 29 receives a row address to select the appropriate rows of the LED rate 25.

Yet another application of the present invention is in a projection-based display system, such as one which uses a high intensity discharge (HID) lamp, or arc lamp, as an illumination source. Such a system may include a spinning a color wheel disposed somewhere between the illumination source and the user to achieve time sequential color display. FIGS. 10 through 13 illustrate four embodiments for such an application.

Figure 12:
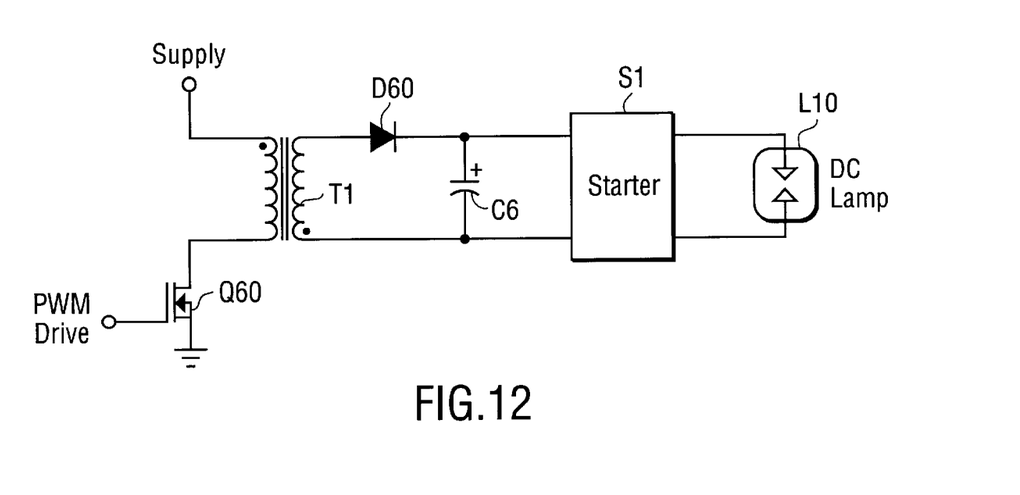
FIG. 12 illustrates a flyback configuration of a drive circuit for driving a DC HID lamp.

FIG. 12 shows a drive circuit for a direct current (DC) HID lamp, using a flyback configuration. As shown, transistor Q60 is an NFET, which performs the same functions as Q4 in the embodiments described above. In other embodiments, however, Q60 may be replaced by any other suitable type of switching device, such as a PFET or an insulated-gate bipolar transistor (IGBT). The gate of Q60 is coupled to the PWM drive signal. The source of Q60 is grounded, and the drain of Q60 is coupled to the power supply through the primary coil of flyback transformer T1. Coupled in series with the secondary coil of transformer T1 are diode D60 and capacitor C6. Lamp starter S1 is coupled across the capacitor C6, and the DC HID lamp L10 is coupled to the output of lamp starter S1.

Flyback transformer T1 is used in place of inductor L1 (see FIG. 4) but in the same manner that inductor L1 is used.

That is, transformer T1 stores energy when Q60 is turned on and then provides that stored energy to lamp L10 when Q60 is turned off. Further, transformer T1 increases the supply voltage to an operating suitable for the lamp L10. Lamp starter S1 generates a higher voltage to ignite the lamp when the lamp is cold.

Figure 13:
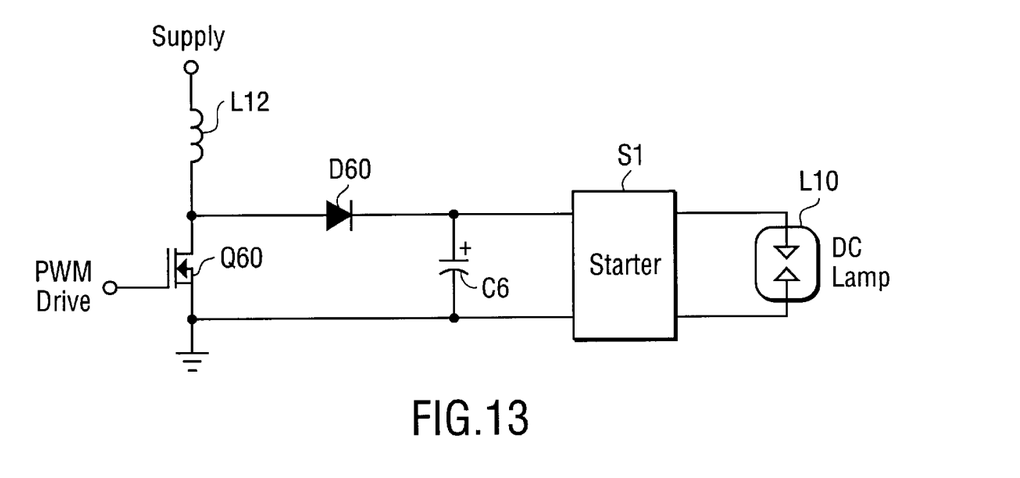
FIG. 13 illustrates a boost configuration of a drive circuit for driving a DC HID lamp.

FIG. 13 illustrates a boost configuration of a drive circuit for driving a DC HID lamp. The boost configuration is similar to the flyback configuration; however, the boost configuration uses an inductor L12 rather than a flyback transformer. Inductor L12 is coupled between the power supply and the drain of Q60. Also, diode D60 is coupled directly to the drain of Q60.

Figure 10:
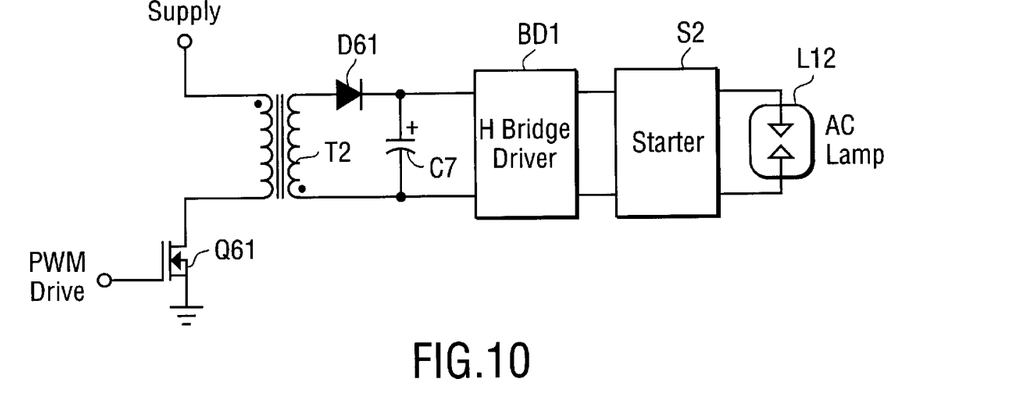
FIG. 10 illustrates a flyback configuration of a drive circuit for driving an AC HID lamp.
Figure 11:
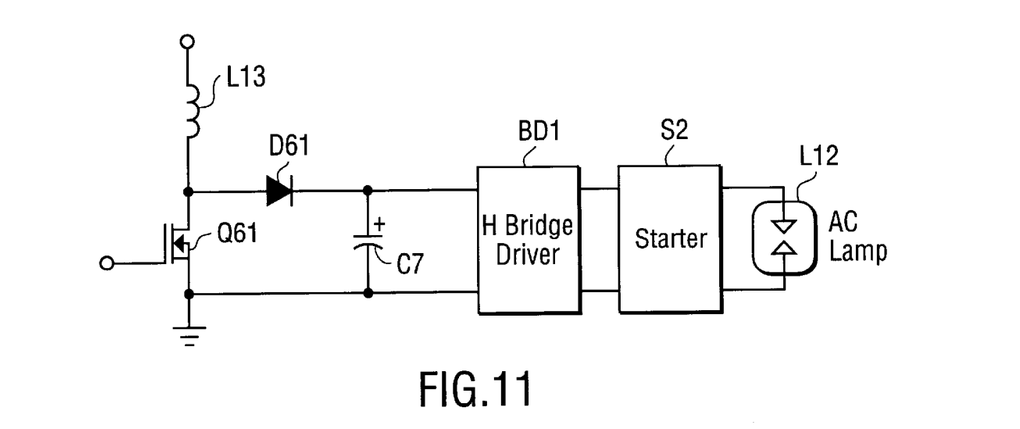
FIG. 11 illustrates a boost configuration of a drive circuit for driving an AC A HID lamp.

FIGS. 10 and 11 illustrate flyback and boost configurations, respectively, of a drive circuit for driving an alternating current (AC) HID lamp L12. The flyback and boost configurations are essentially identical to those used for the DC lamp, except that an H bridge driver BD1 is coupled across the capacitor C7, to convert the DC voltage into an AC voltage required by the AC HID Lamp 12. The input of lamp starter S2 is coupled to the output of bridge driver BD1, and the AC lamp L12 is coupled to the output of lamp starter S2.

Figure 14:
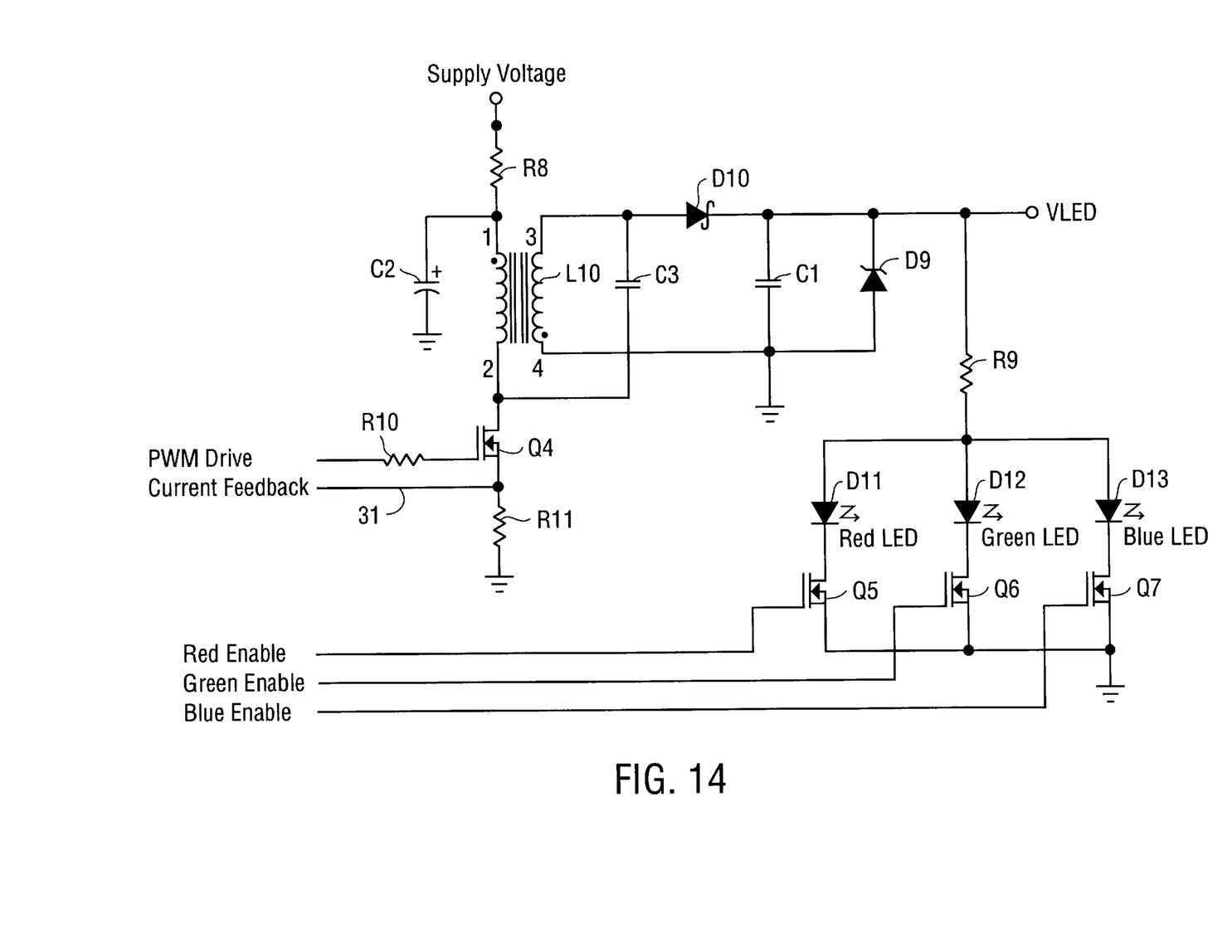
FIG. 14 illustrates a SEPIC switching converter configuration using current feedback for a regulated constant power embodiment, such as for applications which require brightness regulation.

Some embodiments of the PWM drive circuit may employ current-mode control of the PWM drive signal. FIG. 14 illustrates one such embodiment, in which a measurement of the peak inductor current Ipeak is used as feedback to control the on-time of the PWM drive signal, and thus, the amount of energy stored in the inductor for a given pulse. In particular, a feedback measurement of the voltage at node 31 is taken, which is representative of the peak inductor current Ipeak. This voltage is then applied to one input of a comparator. The other input of the comparator receives a predetermined reference value that depends upon the color currently being displayed (i.e., in a time-sequential color system, there may be a different predetermined reference value for each color). The output of the comparator is used to control the on/off state of the PWM drive signal, such that the PWM drive signal is turned off when the peak current Ipeak corresponds to the predetermined reference value. Thus, the peak inductor current determines the amount of energy stored in the inductor for given pulse of the PWM drive signal. Note that FIG. 14 illustrates a common-anode embodiment. As described above, the circuit can be easily reconfigured to a common-cathode configuration.

If current mode control is used in this manner, then equation (1) above is replaced by equation (2), below.

$$\text{Output Power} = \frac{L1 \cdot Ipeak^2 \cdot Q4 \text{ Frequency}}{2} \qquad (2)$$

Figure 15:
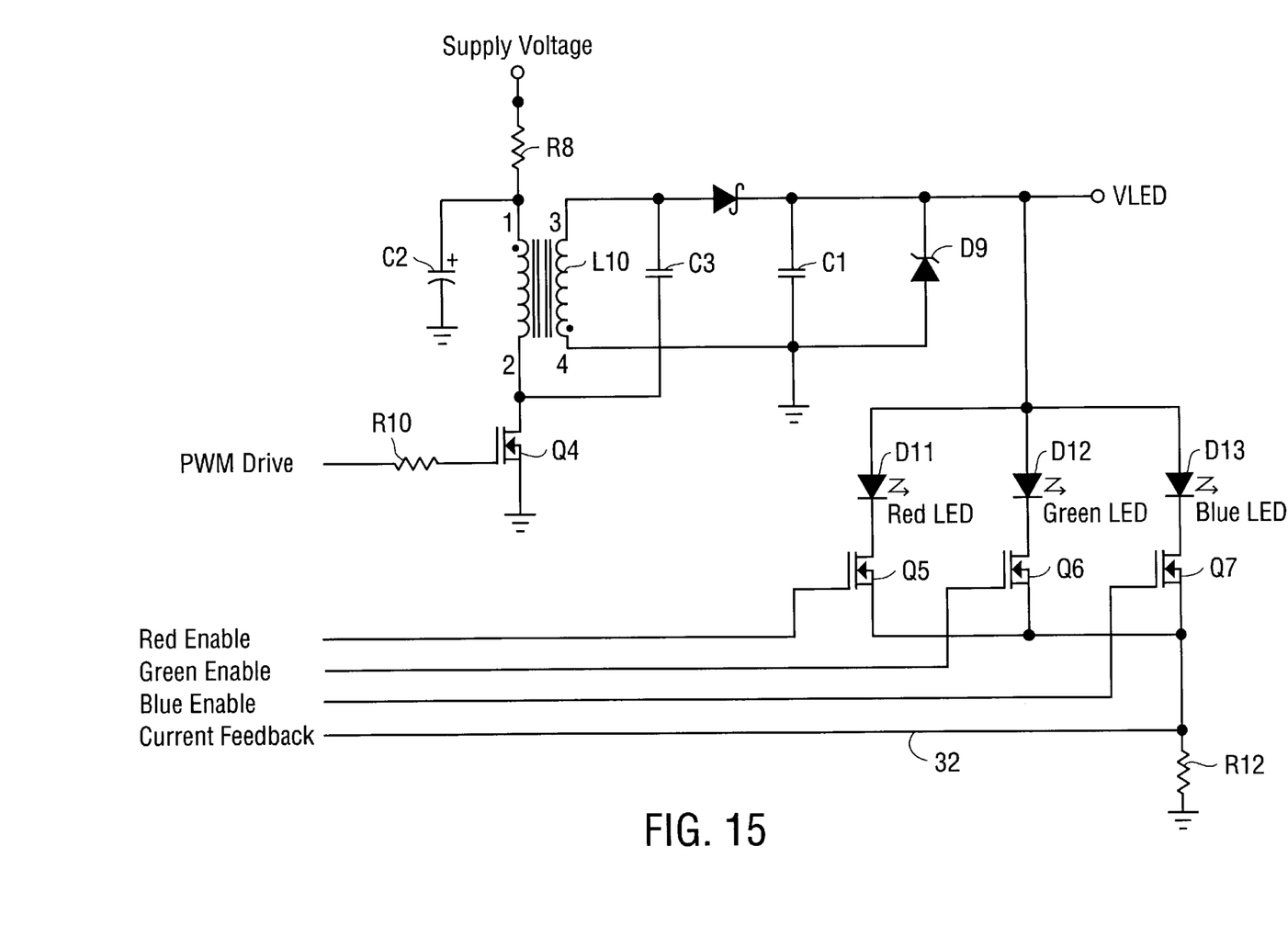
FIG. 15 illustrates a SEPIC switching converter configuration using current feedback for a regulated constant current embodiment, such as for applications which require brightness regulation.

Note that in those embodiments described above which do not employ current-mode control, color balance is independent of power supply voltage, although overall brightness may not be. Since the human eye is generally less sensitive to variations in overall brightness than to variations in color balance, that characteristic may be acceptable for many applications. However, the use of current-mode control, such as illustrated in FIGS. 14 and 15, allows brightness to be independent of the power supply voltage. As with the above embodiments, overall brightness can be controlled by adjusting the frequency of the PWM drive signal.

FIG. 15 illustrates another embodiment using current-mode control (in common-anode configuration), in which the output current is used as feedback to achieve constant current through the illumination source. In particular, the voltage at node 32 is used in the same manner as described in connection with FIG. 14 to control the on/off state of the PWM drive signal. Note that numerous variations upon the embodiments shown in FIGS. 14 and 15 are possible.

Thus, drive circuits for driving color pixels or illumination sources using a variable on-time drive signal have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A circuit for controlling a pixel in a time-sequential color based display device, the circuit comprising:
   a plurality of color elements associated with the pixel, each color element for displaying light of a different color;
   a plurality of transistors, one for each of the color elements, each of the plurality of transistors having a source-to-drain path coupled in series with a corresponding one of the color elements between a power supply node and an output node, each of the plurality of transistors further having a gate coupled to a separate one of a plurality of enable signals, each enable signal for enabling the corresponding color element during each frame; and
   a switching converter including:
      an energy storage device having a first node coupled to receive a supply voltage;
      a drive transistor having a source-to-drain path coupled in series between a second node of the energy storage device and a power supply reference voltage, the drive transistor further having a gate coupled to a drive signal, the drive signal for causing powering of each of the plurality of color elements during each of a plurality of frames;
      a diode; and
      a capacitor coupled in series with the diode, the series combination of the capacitor and the diode coupled in parallel with the energy storage device, a common node between the capacitor and the diode forming the output node.

2. A circuit according to claim 1, wherein the switching converter comprises a boost switching converter.

3. A circuit according to claim 1, wherein the switching converter comprises a flyback switching converter.

4. A circuit according to claim 1, wherein the drive signal has a different on-time associated with each of the plurality of color elements within each frame.

* * * * *